No. 880,640. PATENTED MAR. 3, 1908.
C. H. EMERSON.
QUESTION ANSWERING DEVICE.
APPLICATION FILED JUNE 27, 1907.

2 SHEETS—SHEET 1.

Attest:
Edward L. Kingla.
Blanche L. Chadwell.

Inventor:
Charles H. Emerson,
By Nowell Battle
Attorney.

No. 880,640. PATENTED MAR. 3, 1908.
C. H. EMERSON.
QUESTION ANSWERING DEVICE.
APPLICATION FILED JUNE 27, 1907.
2 SHEETS—SHEET 2.
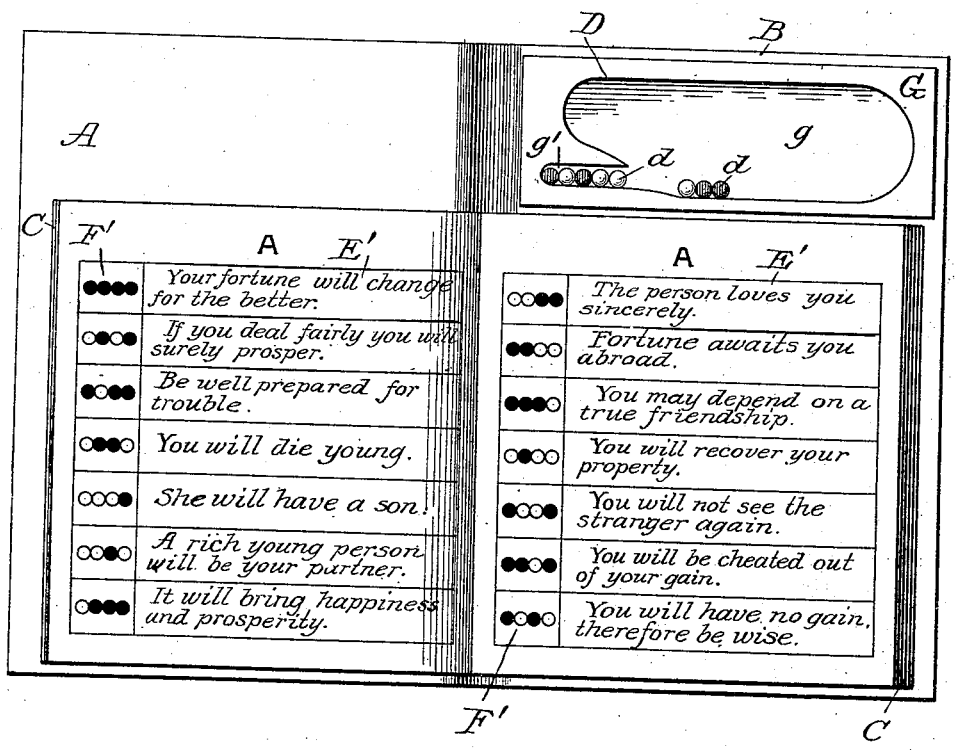
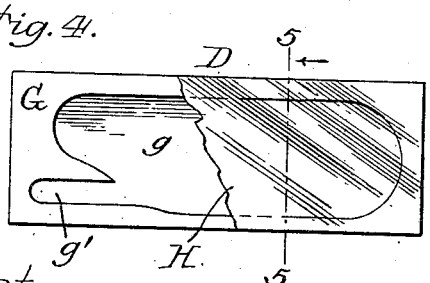
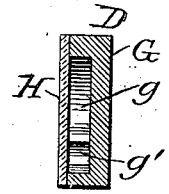
Attest:
Edward L. Kengla
Blanche L. Chadwell
Inventor:
Charles H. Emerson,
By
Attorney.

UNITED STATES PATENT OFFICE.

CHARLES H. EMERSON, OF WHITEHALL, NEW YORK.

QUESTION-ANSWERING DEVICE.

No. 880,640.

Specification of Letters Patent.

Patented March 3, 1908.

Application filed June 27, 1907. Serial No. 381,122.

*To all whom it may concern:*

Be it known that I, CHARLES H. EMERSON, a citizen of the United States, residing at Whitehall, in the county of Washington and State of New York, have invented new and useful Improvements in Question-Answering Devices, of which the following is a specification.

My invention relates to a question answering device wherein a chance-controlled device is relied upon for selecting one of a series of answers to a given question; and said invention consists in the features hereinafter described and particularly pointed out in the appended claims.

Figure 1:
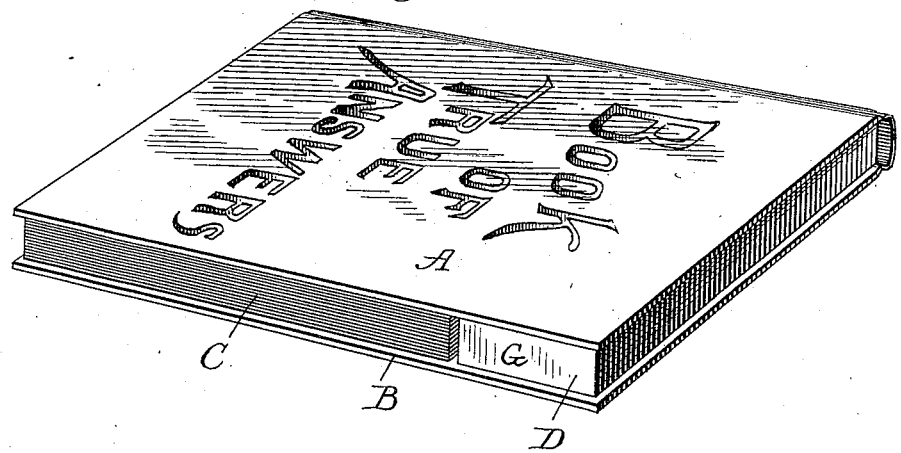
Figure 2:
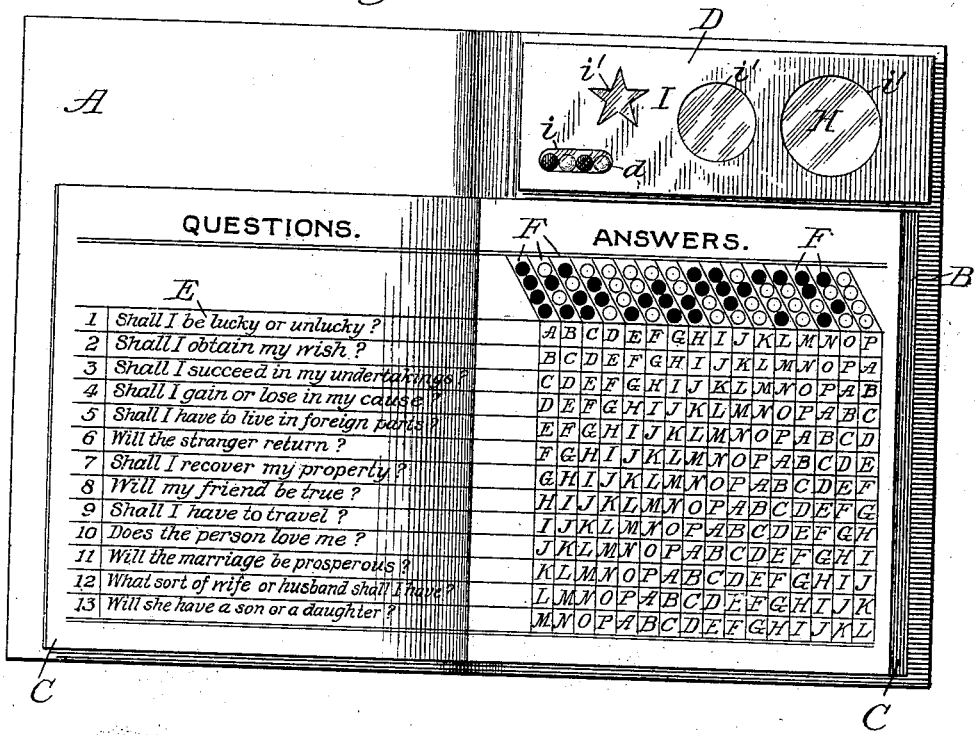

Referring to the accompanying drawings: Figure 1 is a perspective view of a book of questions and answers embodying my invention. Fig. 2 shows the book opened to a page of questions, and showing a chance controlled device mounted on one of the side covers of the book. Fig. 3 is a view corresponding to Fig. 2 showing pages of the book on which answers are printed, and also showing the chance controlled device with the front plate or cover removed. Fig. 4 is a detached view of the chance controlled device with a portion of the front plate or cover broken away, and Fig. 5 of a vertical section of Fig. 4, on line 5—5.

Referring to said drawings, A and B indicate the side covers of a book, and C the leaves thereof. The side covers A and B extend sufficiently above the leaves C to afford space between the covers for a chance controlled device D, which is mounted upon one of the side covers, and which is preferably of such a character that the book when closed will not be in appearance materially unlike an ordinary book.

On a certain page or pages of the book is printed a series of questions, such as illustrated at E in Fig. 2. These questions E are arranged in a column as shown, and to the right of each question is a series of reference characters or letters A, B, C, etc., which refer to pages in the book on which answers to the questions may be found. The reference characters or letters A, B, C, etc., are arranged in vertical columns, and at the top of each column there is a designating mark F referring to a particular answer on the pages indicated by the reference letter in the particular column. As illustrated in the drawings, the reference characters F each consists of a row of four circular dots, some of which are white and some black, the arrangement as to color of the dots being such that no two columns of reference characters will have exactly the same designating mark. For example, the designating mark F at the top of the first column of reference characters is a row of four black dots. The designating mark at the top of the next column is a row of four dots arranged in the following order: white, black, white, black. At the top of the next column the dots are arranged in the following order: black, white, black, white. The remaining columns have still different arrangements of dots so that no two columns have exactly the same designating mark.

The answers to the questions E are printed on pages of the book which are lettered to correspond with the reference letters opposite the before-mentioned questions. In Fig. 3 is shown two pages lettered "A", and on these pages is printed a series of answers E', and opposite each answer is a designating mark F' consisting of a row of four dots corresponding as to color and arrangement with some one of the marks F at the top of the columns of reference letters opposite the questions to be answered.

The chance controlled device D is arranged to indicate by chance, one of the columns of reference letters opposite, or to the right of the series of questions E, and thus direct a person to a particular answer. As illustrated, said device D consists of a receptacle for a number of small balls *d* made of glass or other suitable material, and which are colored to represent the black and white dots constituting the designating marks F,— there being four white and four black balls, so that the various color arrangements may be formed, as will be hereinafter described.

The ball receptacle may be conveniently formed from a block of wood G of proper size, hollowed out to form a ball mixing chamber *g* and a ball receiving pocket *b'*, the latter being adapted to receive the balls from the mixing chamber in a file or row, but in such relations as to color as may result from the chance order in which the balls enter said pocket. After the balls have been placed in the hollowed-out block or receptacle G, the latter is closed by a glass cover or plate H, which is secured to the block by means of a sheet of fabric or paper, I, pasted over the glass and secured to the sides of the block G. The paper or fabric I is cut out as at *i* to form an opening opposite the ball pocket *g'* through which opening the balls may be seen, said opening being of proper size to disclose four balls only. If desired, the paper or fabric I may be provided with other openings $i'$, for the purpose of ornamentation, but these openings $i'$ serve no useful purpose. The chance controlled device as a whole is mounted on the side-cover B of the book, and is by preference of such dimensions as will substantially fill all of the space between the covers A and B above the leaves C, so that when the book is closed, it will present a neat and unobjectionable appearance, as illustrated in Fig. 1.

The manner of using the device is as follows: The person who desires an answer to a particular question moves the book in such manner as to cause the balls $d$ in the chance controlled device to be thoroughly mixed in the mixing chamber $g$, and then so tilts the book as to cause the balls to roll in the ball receiving pocket $g'$, when four of the balls will be visible, as shown in Fig. 2. The color arrangement of the visible balls determines the answer which the person is to accept as the correct answer to any one of the series of questions in the book, to which an answer is desired. In Fig. 2, the chance controlled device shows the balls in the following order: black, white, black, white. Assuming this to be the chance arrangement of the balls, the person selects any one of the questions E, and follows the line in which the question stands to the right until the reference letter is reached which is directly beneath the dots F which are arranged in the order indicated by the balls $d$, viz., black, white, black, white. Assuming this letter to be A, the person turns to the pages in the book lettered "A", (Fig. 3), where the desired answer is found opposite a like arrangement of dots F'.

Having thus described my invention, what I claim as new and desire to secure by Letters Patent is:

1. A question answering device comprising a book containing a series of questions and a series of answers for each question, the answers in each series of answers having a distinctive designating mark, and a chance-controlled device mounted between the covers of the book and constructed to indicate by chance a particular answer in each series of answers.

2. A question answering device comprising a book containing a series of questions and a series of answers for each question, said book having side covers extending beyond the leaves to afford space for a chance-controlled device, and a chance-controlled device mounted between said side covers, said chance-controlled device being constructed to select by chance one of the answers in each series of answers.

3. A question answering device comprising a series of questions, each question having a series of reference characters associated therewith, each referring to a series of answers, a series of answers for each question, the answers in each series having a different designating mark, and a chance-controlled device constructed to indicate by chance a particular answer in each series of answers.

4. A question answering device comprising a book containing a series of questions and a series of answers for each question, the answers in each series of answers having a different designating mark, said book having side covers extending above the book leaves to afford space between the covers for a chance-controlled device, and a chance controlled device mounted on one of said side covers consisting of a receptacle provided with a ball mixing chamber and a ball pocket communicating therewith in which balls from the mixing chamber may be received in a file or row, said receptacle containing a series of balls, some of which are distinguishable from others, and which are adapted by chance arrangement in said ball pocket to indicate a particular answer in each of said series of answers.

In testimony whereof I have hereunto set my hand in presence of two subscribing witnesses.

CHARLES H. EMERSON.

Witnesses:
C. W. FOWLER,
E. L. KEUGLA.